(12) United States Patent
Rickard et al.

(10) Patent No.: US 8,751,716 B2
(45) Date of Patent: *Jun. 10, 2014

(54) ADAPTIVE DATA THROTTLING FOR STORAGE CONTROLLERS

(75) Inventors: Tommy Rickard, Hampshire (GB);
William J. Scales, Hampshire (GB);
Barry Whyte, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,676

(22) Filed: Aug. 3, 2012

(65) Prior Publication Data

US 2013/0036242 A1    Feb. 7, 2013

Related U.S. Application Data

(63) Continuation of application No. 12/164,668, filed on Jun. 30, 2008, now Pat. No. 8,255,562.

(51) Int. Cl.
*G06F 13/36* (2006.01)
*G06F 11/00* (2006.01)

(52) U.S. Cl.
USPC .............................. 710/118; 714/1

(58) Field of Classification Search
None
See application file for complete search history.

(56) References Cited

U.S. PATENT DOCUMENTS

| | | | |
|---|---|---|---|
| 5,926,834 A | 7/1999 | Carlson et al. | |
| 6,381,674 B2 | 4/2002 | DeKoning et al. | |
| 6,976,186 B1 | 12/2005 | Gardner | |
| 7,251,743 B2 | 7/2007 | Chen et al. | |
| 7,254,683 B2 | 8/2007 | Burton et al. | |
| 7,353,339 B2 | 4/2008 | Komarla et al. | |
| 7,549,080 B1 | 6/2009 | Gardner et al. | |
| 7,698,453 B2 | 4/2010 | Samuels et al. | |
| 2005/0102552 A1* | 5/2005 | Horn | 714/6 |
| 2005/0240792 A1* | 10/2005 | Sicola et al. | 714/1 |
| 2007/0112723 A1* | 5/2007 | Alvarez et al. | 707/2 |
| 2007/0288792 A1 | 12/2007 | Thorpe et al. | |
| 2008/0168246 A1 | 7/2008 | Haustein et al. | |
| 2009/0182836 A1 | 7/2009 | Aviles et al. | |

FOREIGN PATENT DOCUMENTS

EP    0902370    3/1999

OTHER PUBLICATIONS

Office Action dated Apr. 13, 2010 issued by the USPTO in parent case, U.S. Appl. No. 12/164,668.
Notice of Allowance dated Oct. 13, 2010 issued by the USPTO in parent case, U.S. Appl. No. 12/164,668.
Notice of Allowance dated Apr. 18, 2012 issued by the USPTO in parent case, U.S. Appl. No. 12/164,668.

* cited by examiner

*Primary Examiner* — Hyun Nam
(74) *Attorney, Agent, or Firm* — Scully, Scott, Murphy & Presser, P.C.

(57) ABSTRACT

There are provided a method, a system and a computer program product for minimizing data transfer latency between redundant storage controllers in a network-based storage controller system that utilizes adaptive data throttling. Each corresponding redundant storage controller calculates average time latency for round trip communications between the corresponding redundant storage controller and the other redundant storage controllers during a fixed monitoring period. The corresponding redundant storage controller, at the end of each fixed monitoring period, compares the average time latency to a fixed latency. The corresponding redundant storage controller selectively throttles data transfer between the corresponding redundant storage controller and a server and data transfer between the corresponding redundant storage controller and a back-end storage, based on the comparison.

23 Claims, 3 Drawing Sheets

ADAPTIVE DATA THROTTLING FOR STORAGE CONTROLLERS

CROSS REFERENCE TO RELATED APPLICATION

This application is a continuation of U.S. patent application Ser. No. 12/164,668, filed Jun. 30, 2008 the entire content and disclosure of which is incorporated herein by reference.

BACKGROUND OF THE INVENTION

The present invention relates to network-based storage systems with redundant storage controllers, and more particularly, for adaptive data throttling of redundant storage controller communications to give priority to inter-controller data writes (mirroring operation between redundant controllers) thereby minimizing latency for processing I/O write requests submitted from the server to one of the redundant storage controllers.

A variety of network-attached and SAN (Storage Area Network) storage systems are known to provide for data to be stored on an Ethernet or other IP-based networks. Typically, the known storage systems include one or more storage controllers. The storage controllers control and provide network-based access to respective arrays of storage disk drives, e.g., redundant arrays of independent disks (RAIDs). Each storage controller typically includes a buffer or cache memory used to temporarily store data as it is transferred between the network and that controller's disk drives. For example, incoming data packets containing I/O (input/output) write data are maintained in a storage controller cache or buffer until successfully written to the appropriate disk drives by the storage controller.

Known storage systems implement storage controller failover mechanisms to protect against the possible failure of a storage controller. One failover mechanism includes that two storage controllers are paired to provide controller redundancy. Each of the redundant storage controller maintains a mirrored copy of the other storage controller's cache, and configuration data. If one of the paired storage controllers detects a failure by the other, the non-failing storage controller takes control of the failing controller's associated disk drives, allowing these disk drives to be accessed via the network while the failing storage controller is replaced. In doing so, the non-failing storage controller effectively "picks up" the workload of the failing controller, preferably seamlessly at failure. Upon replacement of the failing controller, a synchronization or "rebind" operation is carried out by the non-failing controller to copy over the cache and configuration data needed to bring the new storage controller on line.

FIG. 1A herein depicts a functional block diagram of a known network-based storage system (102), including redundant controllers that intermessage using conventional network protocol. Storage system (102) includes a data storage repository, or storage (110) that is connected to first and second controllers (120A) and (120B), respectively. Also, each of first and second controllers is connected to a network server (130). Both the first and second controllers include a cache memory (not expressly shown in the figure). When a write I/O write request from the server (130) is received by one of the controllers, for example, first controller (120A), the first controller fetches the data to be written (stored) from the server.

Upon receipt of the write I/O data in the cache of first controller (120A), a copy of the write data is sent and written to the cache storage in second controller (120B). This redundant copy of I/O write data written to and stored in the cache of the second controller (120B) is said to mirror the data in the first controller (120A). Data mirroring in redundant storage controllers ensures that both controllers have a copy of the data, so if one goes down, the data are not lost because it still retrievable from the other good redundant controller. Once the second controller acknowledges that it has a copy of the I/O write data from the first controller, the write I/O request from the server (130) is complete. Subsequently, one of the controllers submits a write I/O request to the (back-end) storage, and transfers the data from its cache to the back-end storage. The data so stored is accessible to either controller upon a read request.

When a read I/O request is received by one of the controllers (120A; 120B), for example, first controller (120A), the first controller determines whether the requested read I/O data is present in the first controller's cache memory. If the requested read I/O data are present in the first controller's cache, the first controller completes the read I/O request by transferring the data (present) from the controller directly to the server. But where the requested read I/O data is not present in the controller's cache at the time of the read I/O request, the controller reads the requested data from the (back-end) storage (110), transferring the data to the server (130). Optionally, the first controller (120A) may choose to cache the data read from storage (110) a read cache.

While it is known to interconnect cooperating or redundant storage controllers for intercontroller messaging using a dedicated memory bus or communication channel, for example, a PCI bus, redundant storage controllers more typically carry out inter-controller messaging using the same media and protocol used to communicate with the server, and fixed storage (e.g., server (130) and storage (110)). For example, SAN Volume Controller, manufactured by International Business Machines (IBM) Corporation, controls a storage area network (SAN) including communication between servers, back-end storage and redundant storage controllers using conventional network communication links and protocol.

FIG. 1B is a simplified representation of a storage control system (104) comprising a storage area network, or SAN (140). SAN (140) is connected to a server (130), to a first controller (120(A)), to a second controller (120(B)) and to a data storage repository, or storage (110). Messaging, including mirroring between redundant controllers uses the same SAN network communication medium and protocol for message exchange between the controllers and server and controller and back-end storage. Consequently, the available bandwidth of the communication medium by the protocol is shared for each of the above-described controller communications. Where the network communication and protocol supports full duplex (data can be sent and received simultaneously), then the three above described data transfer functions share the outbound bandwidth, and the three functions share the inbound bandwidth. Where the communication medium and protocol is simplex rather than duplex, all of the aforementioned six types of data transfer share the bandwidth of the communication link.

To be effective, the write cache implemented by a storage controller must be sufficiently fast so that write I/O requests submitted to the server are completed with a lower latency than the latency in writing directly from the server to the back-end storage. A significant factor in the time required for the controller to process a write I/O request is the time required to mirror the I/O write data to the other (redundant) controller. Techniques have developed in an effort to minimize the latency for transferring data between controllers, to better control time required for processing write I/O requests.

In one known storage system, a plurality of storage subsystem controllers are arranged to share access to common storage elements. Instead of maintaining a cache in each storage controller, however, the known storage system includes an intelligent centralized cache (also referred to as a cache controller) shared by all controllers in a storage subsystem. Because the intelligent cache controller is centralized, each controller sharing its function is simplified. Such known controller structure and operation, however, while eliminating local cache memory, does not have the disaster protection inherent in redundant storage controller systems, by their respective redundant cache memories. If the central cache goes down, all data is lost.

While other known storage systems use dedicated communication links between controllers, dedicated inter-controller links have the disadvantage of requiring additional hardware, and in many implementations (for example, if a PCI bus is used as the communication link), impose physical restrictions on the location of the controllers. Other known attempts at solutions at minimizes latency of intercontroller data mirroring operations include the use of static throttling. Static throttling is a technique whereby the storage controllers are controlled to simply throttling the speed of different types of data transfer, without any regard for the current latency of communications between controllers. While static throttling may ensure that latency of communications between controllers is kept low, such an improvement (decrease) in latency times is at the expense of not exploiting the full available bandwidth of the communication link for other I/O workloads.

SUMMARY OF THE INVENTION

The present invention is presented in an effort to remedy the shortcomings of known storage system operation that includes redundant storage controllers with no dedicated inter-controller link. The invention is directed to only those storage systems and storage appliances that include redundant storage controllers but do not have a dedicated communication link between the redundant controllers. That is, communication between controllers comprises the same links and requires the same protocol used for all other data transfers and communications to and from the controllers.

The inventive method and system detect when the communication between controllers is adversely affected by either a) insufficient bandwidth to transfer data between the controllers (data mirroring between redundant controller cache memories), or b) inordinate transfer delay between the controllers. The invention addresses these problems by throttling data transfers between the controllers and servers, and between the controllers and back-end storage to give a higher priority to the data mirroring between redundant controllers. Such inventive operation minimizes the latency of communications between the controllers, and therefore minimizes the latency in processing write I/Os requests submitted from a server to a controller.

In a preferred embodiment, the method for minimizing latency data transfer between the redundant storage controllers in a network-based storage controller system that utilizes adaptive data throttling includes the following steps. Each redundant storage controller monitors latency for round trip communications between the redundant controllers by calculating a time required to mirror a write to the other controller and receive a write acknowledge. The controller calculates an average latency for round trip communications between the redundant controllers during a fixed monitoring period. At the end of each fixed monitoring period, the average latency is compared to a fixed latency to access the average time latency for mirroring writes is good, acceptable or unacceptable.

If the average time latency is good, the one controller reduces or disables throttling for data transfers between the one controller and the server, and between the one controller and back-end storage, increasing the number of this type of data transfer that can be run in parallel. If the average time latency is acceptable, the one controller does not adjust throttling for data transfers between the one controller and the server, and between the one controller and back-end storage. If the average time latency is unacceptable, the one controller increases data throttling for data transfers between the one controller and the server, and between the controller and the back-end storage, decreasing the number of this type of data transfer that can be run in parallel.

BRIEF DESCRIPTION OF THE DRAWING FIGURES

The present invention is illustrated by way of example and not limitation in the figures of the accompanying drawings. The same numbers are used throughout the figures to reference like components and/or features.

DETAILED DESCRIPTION OF THE INVENTION

The various method embodiments of the invention will be generally implemented by a computer, microprocessor, microcontroller or other control circuitry (the controller circuitry) in the storage controllers that run a sequence of program instructions for carrying out the steps of the inventive method, assuming all required data for processing is accessible to the controller circuits. The sequence of program instructions may be embodied in a computer program product comprising media storing the program instructions, and downloaded for ready access by the controller circuitry. The computer program product may comprise media, for example a compact storage medium such as a compact disc, which is read by the storage controller by any means known to the skilled artisan for providing the computer program product to the storage controller for running thereby.

The computer program product comprises all the respective features enabling the implementation of the inventive method described herein, and which—when loaded into the storage controller for running by the computer therein—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form. The computer program product may be stored within the storage controller, or may be located on a remote system such as a server (130).

Figure 1A:
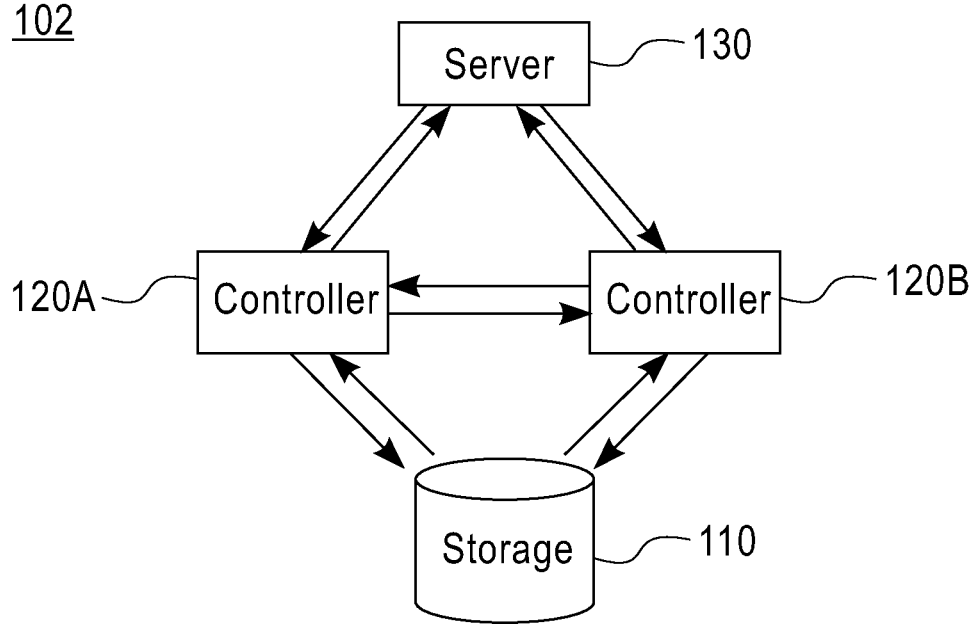
FIG. 1A is a schematic representation of a network storage control system that utilizes redundant storage controllers and data mirroring.
Figure 1B:
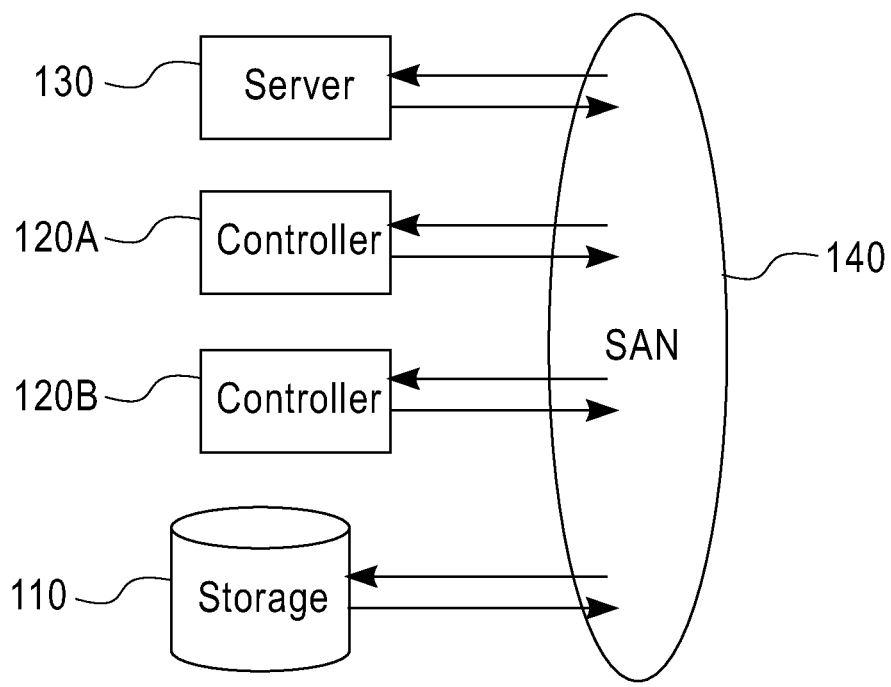
FIG. 1B is a schematic representation of a storage area network (SAN) that utilizes redundant storage controllers and data mirroring.
Figure 2A:
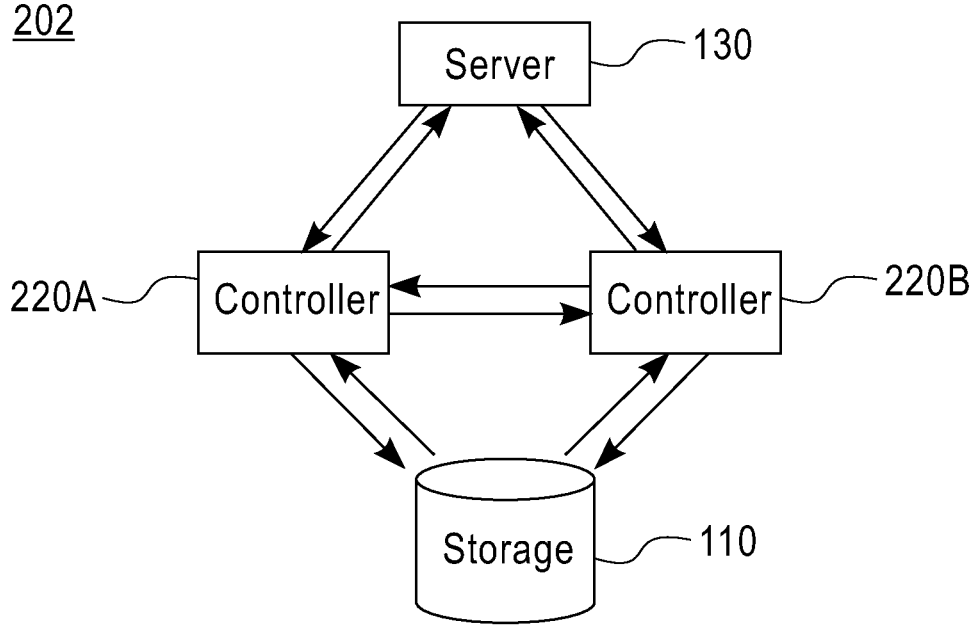
FIG. 2A is a schematic representation of a network storage control system in which adaptive data throttling to minimize the latency of data transfer between controllers is implemented.

FIG. 2A is a schematic representation of a network storage control system (202) in which adaptive data throttling is implemented to minimize the latency of data transfer between first and second redundant controllers (220A) and (220B) is implemented. Storage control system (202) includes a data storage repository, or storage (110) that is connected to the first and second controllers (220A) and (220B), respectively. Each of first and second controllers is shown connected to a network server (130), and includes cache memories (not expressly shown in FIG. 2A). When I/O data is stored (written) to a cache of one of the controllers, a copy of the data is sent to the cache storage in the other controller, mirroring the data. Hence, if one controller goes down, the data is present on the other controller. Inter-controller cache writes (mirroring) is conducted using the same media and protocol used by the controllers to message with the server, and fixed storage.

For the inventive operation, each of the first controller (220A) and second controller (220B) monitor latency for round trip communications between controllers, calculating the average amount of time it takes to mirror or write a copy of data received to the other controller, and receive an acknowledgement. An average is then calculated for all data mirror transfers between two controllers for some fixed time intervals (e.g., every 100 milliseconds). At the end of each time interval, the average latency for the mirroring operation is tested to determine whether the latency is good (say less than 0.5 milliseconds), acceptable (say between 0.5 milliseconds and 2 milliseconds) or bad (say greater than 2 milliseconds).

If the latency is good then the controller reduces or disables throttling of other data transfers between the controller and the server or back-end storage by increasing the number of this type of data transfer that can be started in parallel. If the latency is acceptable then the controller does not adjust its throttling rate. If the latency is bad then the controller will enable or increase its level of throttling data transfer between the controller and the server and between the controller and the back-end storage by decreasing the number of this type of data transfer that can be started in parallel.

Figure 2B:
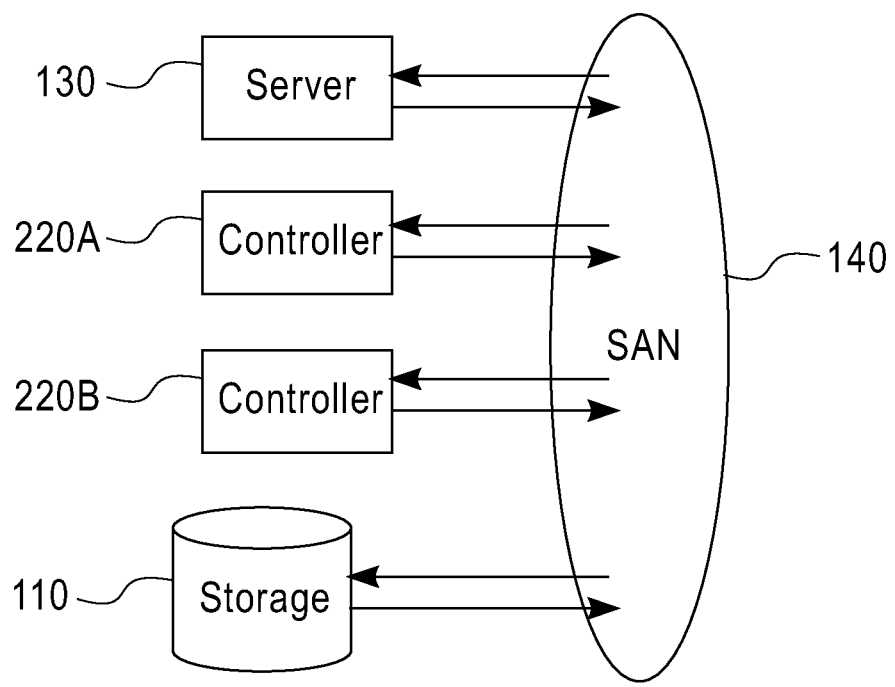
FIG. 2B is a schematic representation of a storage area network (SAN) in which adaptive data throttling to minimize the latency of data transfer between controllers is implemented.

FIG. 2B is a simplified representation of a storage control system (204) comprising a storage area network, or SAN (140). SAN (140) is connected to a server (130), to a first controller (220(A)), to a second controller (220(B)) and to a data storage repository, or storage (110). Messaging, including mirroring between the redundant controllers uses the same SAN network communication medium and protocol for message exchange between the controllers and server and the controller and back-end storage. Consequently, the available bandwidth of the communication medium by the protocol is shared for each of the above-described controller communications. Where the network communication and protocol supports full duplex (data can be sent and received simultaneously), then the three above described data transfer functions share the outbound bandwidth, and the three functions share the inbound bandwidth. Where the communication medium and protocol is simplex rather than duplex, all of the aforementioned six types of data transfer share the bandwidth of the communication link.

For the inventive operation, each of the first controller (220A) and second controller (220B) monitor latency for round trip communications between controllers, calculating the average amount of time it takes to mirror or write a copy of data received to the other controller, and receive an acknowledgement. An average is then calculated for all data mirror transfers between two controllers for some fixed time intervals (e.g., every 100 milliseconds). At the end of each time interval, the average latency for the mirroring operation is tested to determine whether the latency is good (say less than 0.5 milliseconds), acceptable (say between 0.5 milliseconds and 2 milliseconds) or bad (say greater than 2 milliseconds). Of course the time period that qualifies as good, acceptable or bad is determined by the network storage system administrator.

If the latency is good then the controller reduces or disables throttling of other data transfers between the controller and the server or back-end storage by increasing the number of this type of data transfer that can be started in parallel. If the latency is acceptable then the controller does not adjust its throttling rate. If the latency is bad then the controller will enable or increase its level of throttling data transfer between the controller and the server and between the controller and the back-end storage by decreasing the number of this type of data transfer that can be started in parallel.

In a method embodiment, the inventive controllers implement selective data throttling to minimize the latency of data transfers, or data mirroring between the controllers (such as controllers 220A and 220B of FIGS. 2A and 2B), to avoid such inter-controller data transfers being adversely affected by either insufficient bandwidth between the controllers or inadvertent transfer delay between the controllers. The inventive method reacts to detected insufficient bandwidth by throttling data transfers between the controllers and server, and between the controllers and back-end storage. The inventive method thereby ensures a higher priority for data transfers (mirroring) between controllers, minimizing latency for the cross-cache writes and thereby minimizing the latency in processing write I/O requests submitted from the server to the controller.

In more detail, each of first and second storage controllers (220A; 220B) first monitors latency for round trip communications between controllers and calculates an average time required to mirror a write to the other controller and receive a write acknowledge. An average latency is then calculated by monitoring all transfers between two controllers for a fixed time intervals, e.g., 100 milliseconds. For each fixed time interval, the average latency is compared with the average time to determine whether the latency in the fixed time period is good (say less than 0.5 milliseconds), acceptable (say between 0.5 milliseconds and 2 milliseconds) or bad (say greater than 2 milliseconds).

If the latency is good then the controller reduces or disables the throttling of other data transfers between the controller and the server or back-end storage by increasing the number of this type of data transfer that can be started in parallel. If the latency is acceptable then the controller does not adjust its throttling rate. If the latency is bad then the controller will enable or increase its level of throttling of data transfers between the controller and the server and between the controller and the back-end storage by decreasing the number of this type of data transfer that can be started in parallel.

Regardless of the latency measurements, the inventive method controls operation to permit the same number of concurrent data transfers between controllers. In an alternative implementation, the inventive method prioritizes communication between controllers by increasing the number of concurrent data transfers between them rather than throttling other data transfers. The inventive method may be implemented in storage systems where there are multiple different flows of data from a device across the same communication network, and storage system operation would benefit from the invention's capability to minimize the latency of at least one of the data flows.

Figure 3:
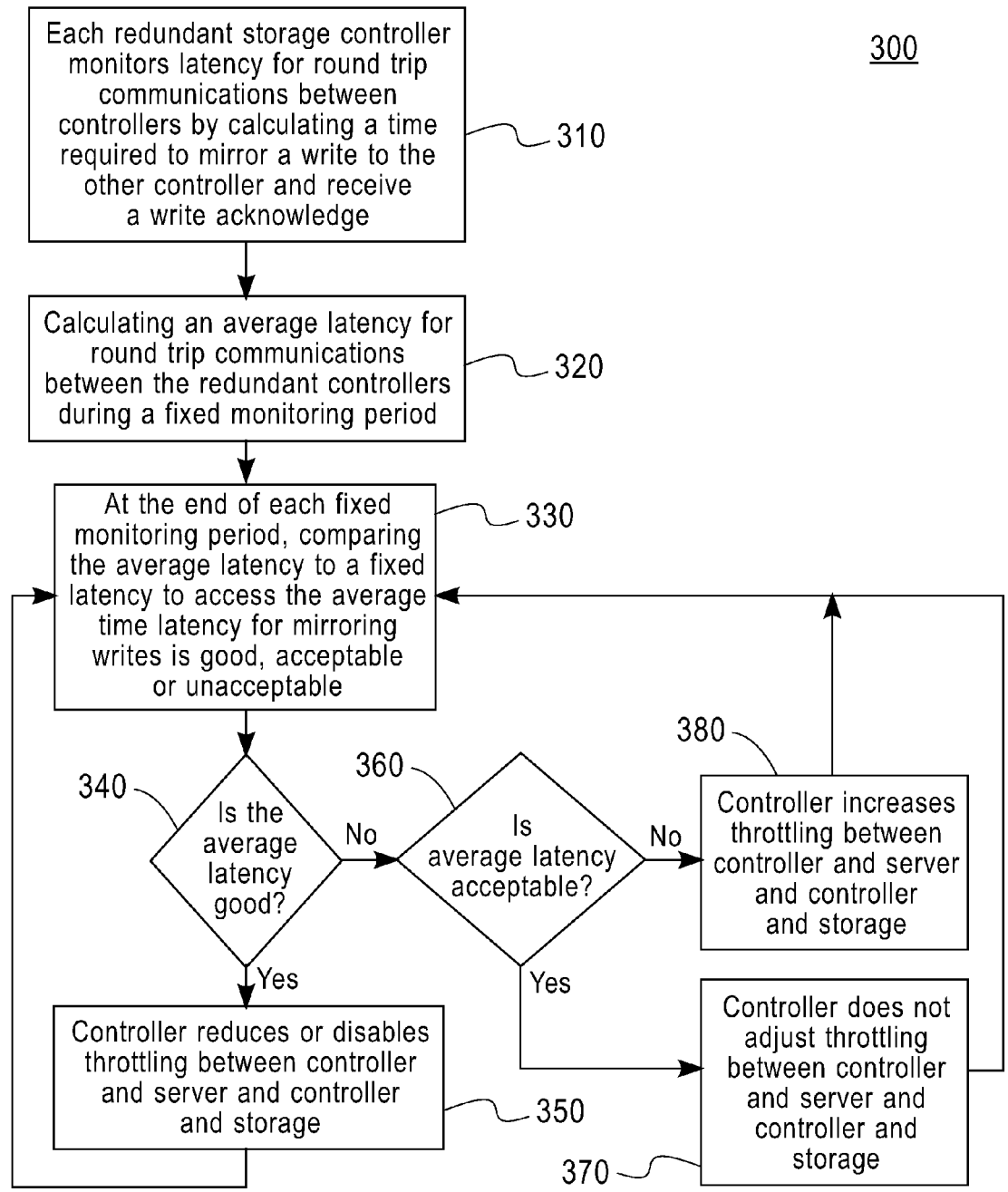
FIG. 3 is a system flow diagram of one embodiment of a method for adaptive data throttling of storage controllers to minimize latency of data transfer between the controllers.

FIG. 3 depicts a system flow diagram of a preferred embodiment of a method (300) for adaptive data throttling of storage controller communications to gives priority to inter-controller data writes (mirroring operation) thereby minimizing latency for processing I/O write requests submitted from the server to one of the redundant storage controllers. In a step represented by block (310), each redundant storage controller monitoring latency for round trip communications between the redundant controllers by calculating a time required to mirror a write to the other controller and receive a write acknowledge. A step of calculating an average latency for round trip communications between the redundant controllers during a fixed monitoring period is shown in cloak (320). At the end of each fixed monitoring period, comparing the average latency to a fixed latency to access the average time latency for mirroring writes is good, acceptable or unacceptable, as depicted by step (330).

If the average time latency is good (340), then one controller reduces or disables throttling for data transfers between the one controller and the server, and between the one controller and back-end storage, increasing a number of this type of data transfer that can be run in parallel, the step represented by block (350). Program flow then progresses to step (330). If the average latency is not good, program flow progresses to step (360). If the average time latency is acceptable (360), the one controller does not adjust throttling for data transfers between the one controller and the server, and between the one controller and back-end storage (370), and program flow then progresses to step (330). If not acceptable, program flow progresses to step (380), where the one controller increases data throttling for data transfers between the one controller and the server, and between the controller and the back-end storage, decreasing a number of this type of data transfer that can be run in parallel, the step represented by block (380). Program flow then progresses to step (330).

Although examples of the present invention have been shown and described, it would be appreciated by those skilled in the art that changes might be made in these embodiments without departing from the principles and spirit of the invention, the scope of which is defined in the claims and their equivalents.

What is claimed is:

1. A method for minimizing data transfer latency between redundant storage controllers in a network-based storage controller system, comprising steps of:
    calculating, by each redundant storage controller, an average time latency for round trip communications between the each redundant storage controller and other redundant storage controllers during a fixed monitoring period;
    at an end of each fixed monitoring period, comparing, by the each redundant storage controller, the calculated average time latency to a fixed latency; and
    selectively throttling, by the each redundant storage controller, data transfer between the each redundant storage controller and a server and data transfer between the each redundant storage controller and a back-end storage, based on the comparison.

2. The method according to claim 1, wherein the selectively throttling data transfer minimizes the calculated average time latency.

3. The method according to claim 1, further comprising:
    prioritizing communications between all redundant storage controllers.

4. The method according to claim 1, wherein the redundant storage controllers do not have dedicated links to communicate each other.

5. The method according to claim 1, further comprising:
    classifying, based on the comparison, the calculated average time latency as good, acceptable and unacceptable.

6. The method according to claim 5, wherein if the calculated average time latency is classified as good, the each redundant storage controller disables throttling for data transfer between the each redundant storage controller and the server, and between the each redundant storage controller and the back-end storage.

7. The method according to claim 5, wherein if the calculated average time latency is classified as acceptable, the each redundant storage controller does not adjust throttling for data transfer between the each redundant storage controller and the server, and between the each redundant storage controller and the back-end storage.

8. The method according to claim 5, wherein if the calculated average time latency is classified as unacceptable, the each redundant storage controller increases data throttling for data transfer between the each redundant storage controller and the server, and between the each redundant storage controller and the back-end storage.

9. A system for minimizing data transfer latency between redundant storage controllers in a network-based storage controller system, the system comprising:
    each corresponding redundant storage controller calculating an average time latency for round trip communications between the corresponding redundant storage controller and the other redundant storage controllers during a fixed monitoring period;
    the corresponding redundant storage controller, at an end of each fixed monitoring period, comparing the average time latency to a fixed latency; and
    the corresponding redundant storage controller selectively throttling data transfer between the corresponding redundant storage controller and a server and data transfer between the corresponding redundant storage controller and a back-end storage, based on the comparison.

10. The system as set forth in claim 9, wherein communications between all redundant storage controllers are prioritized.

11. The system as set forth in claim 9, wherein the corresponding redundant storage controller classifies the calculated average time latency as one of: good, acceptable and unacceptable.

12. The system as set forth in claim 9, wherein the corresponding redundant storage controller and the other redundant storage controllers do not have dedicated links to communicate each other.

13. The system as set forth in claim 11, wherein if the calculated average time latency is classified as good, the corresponding redundant storage controller disables throttling for data transfer between the corresponding redundant storage controller and the server, and between the corresponding redundant storage controller and the back-end storage.

14. The system as set forth in claim 11, wherein if the calculated average time latency is classified as acceptable, the corresponding redundant storage controller does not adjust throttling for data transfer between the corresponding redundant storage controller and the server, and between the corresponding redundant storage controller and the back-end storage.

15. The system as set forth in claim 11, wherein if the calculated average time latency is classified as unacceptable, the corresponding redundant storage controller increases data throttling for data transfer between the corresponding redundant storage controller and the server, and between the corresponding redundant storage controller and the back-end storage.

16. A computer program product for minimizing data transfer latency between redundant storage controllers in a network-based storage controller system, the computer program product comprising:
- a non-transitory storage device readable by a processing circuit and storing instructions run by the processing circuit,
- wherein the processing circuit is configured to perform:
  - calculating, by each redundant storage controller, an average time latency for round trip communications between the each redundant storage controller and other redundant storage controllers during a fixed monitoring period;
  - at the end of each fixed monitoring period, comparing, by the each redundant storage controller, the calculated average time latency to a fixed latency; and
  - selectively throttling, by the each redundant storage controller, data transfer between the each redundant storage controller and a server and data transfer between the each redundant storage controller and a back-end storage, based on the comparison.

17. The computer program product according to claim 16, wherein the selectively throttling data transfer minimizes the calculated average time latency.

18. The computer program product according to claim 16, wherein the method further comprises a step of: prioritizing communications between all redundant storage controllers.

19. The computer program product according to claim 16, wherein the redundant storage controllers do not have dedicated links to communicate each other.

20. The computer program product according to claim 16, wherein the method further comprises a step of: classifying, based on the comparison, the calculated average time latency as good, acceptable and unacceptable.

21. The computer program product according to claim 20, wherein if the calculated average time latency is classified as good, the each redundant storage controller disables throttling for data transfer between the each redundant storage controller and the server, and between the each redundant storage controller and the back-end storage.

22. The computer program product according to claim 20, wherein if the calculated average time latency is classified as acceptable, the each redundant storage controller does not adjust throttling for data transfer between the each redundant storage controller and the server, and between the each redundant storage controller and the back-end storage.

23. The computer program product according to claim 20, wherein if the calculated average time latency is classified as unacceptable, the each redundant storage controller increases data throttling for data transfer between the each redundant storage controller and the server, and between the each redundant storage controller and the back-end storage.

* * * * *